(12) United States Patent
McCormick

(10) Patent No.: US 7,374,524 B2
(45) Date of Patent: May 20, 2008

(54) METHOD, SYSTEM AND PROGRAM PRODUCT FOR ENABLING RAPID CONNECTION OF AUTOMATED TOOLS TO A DEVICE NETWORK

(75) Inventor: Peter E. McCormick, Carrollton, TX (US)

(73) Assignee: Delaware Capital Formation, Inc., Wilmington, DE (US)

( * ) Notice: Subject to any disclaimer, the term of this patent is extended or adjusted under 35 U.S.C. 154(b) by 264 days.

(21) Appl. No.: 11/200,755

(22) Filed: Aug. 9, 2005

(65) Prior Publication Data

US 2006/0041328 A1  Feb. 23, 2006

Related U.S. Application Data

(60) Provisional application No. 60/602,162, filed on Aug. 17, 2004.

(51) Int. Cl.
*B23Q 3/155* (2006.01)

(52) U.S. Cl. ............ 483/4; 483/1; 483/7; 483/10; 483/16; 700/179; 901/41; 318/568.13

(58) Field of Classification Search ........ 483/901, 483/7, 10, 1, 2, 4, 12, 13, 16; 700/179; 901/41; 318/568.13, 568.11
See application file for complete search history.

(56) References Cited

U.S. PATENT DOCUMENTS 3,663,998 A * 5/1972 Cupler, II .............. 483/54
3,667,114 A * 6/1972 Smith et al. .............. 483/5
3,783,253 A * 1/1974 Anderson et al. ........ 318/568.1
4,398,136 A * 8/1983 Tanaka .................. 483/7
5,018,266 A * 5/1991 Hutchinson et al. ........ 483/1
6,084,373 A * 7/2000 Goldenberg et al. ... 318/568.11
6,116,966 A * 9/2000 Little et al. .............. 439/891
6,491,612 B1* 12/2002 Kurup et al. ............ 483/16
6,533,594 B1* 3/2003 Kurup .................. 439/883
6,840,895 B2* 1/2005 Perry et al. ............ 483/1
7,027,893 B2 4/2006 Perry et al.

OTHER PUBLICATIONS (Author Unknown) *Case Study: Oxford Automotive* (Canton, MS), ATI Industrial Automation, Apex, NC; p. 1—no date.
(Author Unknown) *DeviceNet—with and without ATI InstaTool*; ATI Industrial Automation, Apex, NC; 1 pg.—no date.

* cited by examiner

*Primary Examiner*—Dana Ross
(74) *Attorney, Agent, or Firm*—Harness, Dickey & Pierce, P.L.C.

(57) ABSTRACT

A tool changer includes a tool attachment mechanism and a changer electronics module. The changer electronics module implements a tool changer node on a device network for the tool changer and a tool plate node on the device network for a tool plate of an automated tool that may be latched to the tool changer.

20 Claims, 5 Drawing Sheets

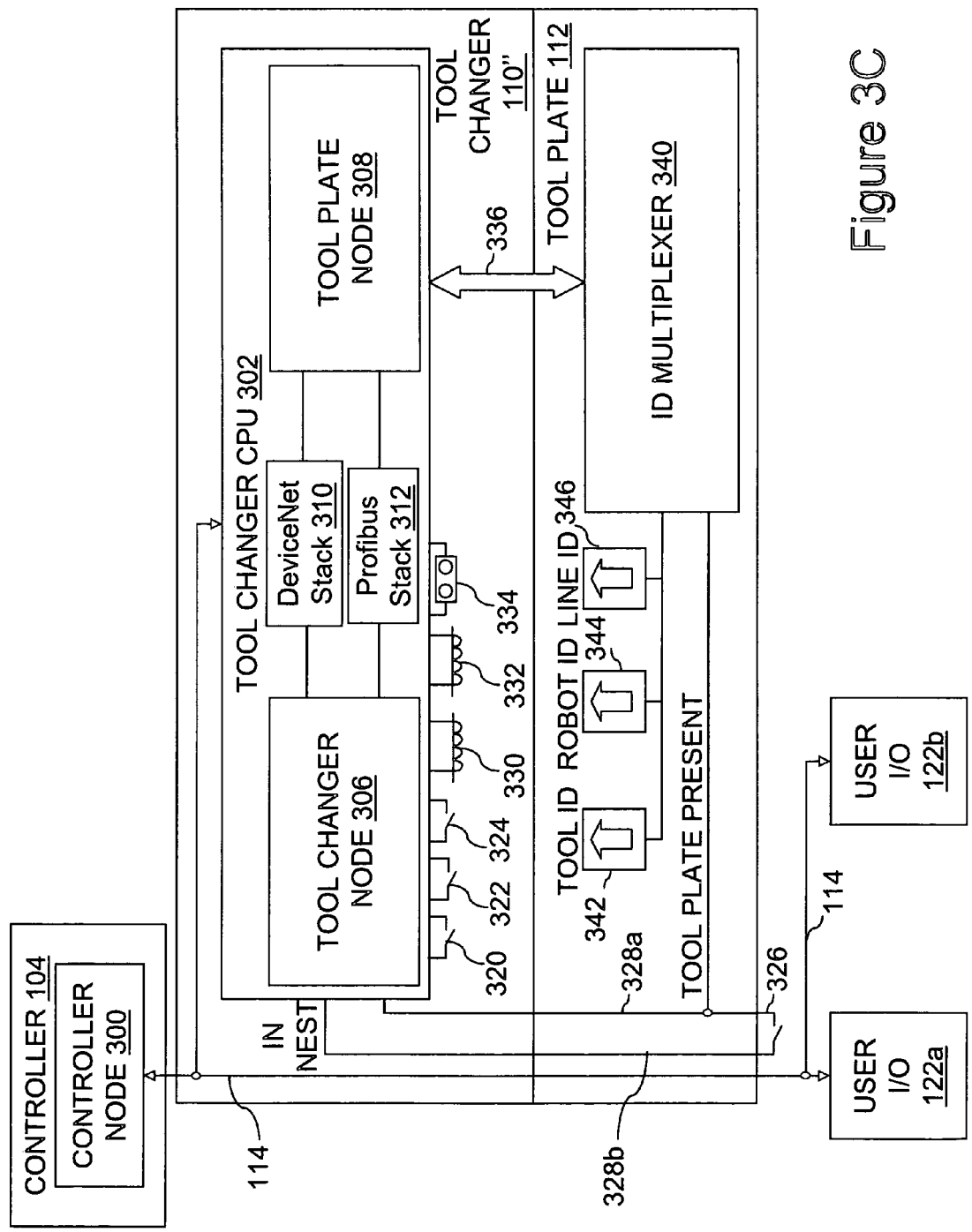

METHOD, SYSTEM AND PROGRAM PRODUCT FOR ENABLING RAPID CONNECTION OF AUTOMATED TOOLS TO A DEVICE NETWORK

PRIORITY CLAIM

The present application claims priority to U.S. Provisional Patent Application 60/602,162 filed Aug. 17, 2004, which is incorporated herein by reference in its entirety.

BACKGROUND OF THE INVENTION

1. Technical Field

The present invention relates in general to automated tooling and, in particular, to communication with automated tools.

2. Description of the Related Art

A DeviceNet™ network is an open, low-level network that provides connections between simple industrial devices, such as sensors and actuators, and higher-level devices, such as Programmable Logic Controllers (PLCs) and computer systems. DeviceNet networks employ a DeviceNet physical layer, a Controller Area Network (CAN) data link layer, DeviceNet transport and network layers, and the Common Industrial Protocol (CIP) at Layer 5 and above. Utilizing this layered network architecture, the DeviceNet network provides control, configuration, and data collection capabilities for industrial devices over a single network. As an open network, DeviceNet also supports the interoperability and common control of diverse intelligent sensors/actuators of multiple vendors over a single network.

A DeviceNet network includes a collection of nodes, each having an associated node number or Media Access Control (MAC) Identifier (ID). The node number of each node is set, for example, using dual in-line package (DIP) switches at each node, and serves as a node priority. Although the DeviceNet standard has been supplemented to support peer-to-peer communication, in many implementations the DeviceNet network has a master/slave configuration in which one or more masters continuously scan a list of slave nodes on the network, issuing Get Attribute service codes (requests) to obtain the current attribute values of the instance(s) of particular objects at the slave nodes. The master(s) implement a control algorithm that, based upon the attribute values obtained from the slave nodes, generates and sets new attribute values for object instances at the slave nodes (via Set Attribute service codes) in order to control future operation of the slave nodes. Further information regarding DeviceNet networks and their operation can be obtained, for example, from Open DeviceNet Vendor Association (ODVA), Inc. of Ann Arbor, Mich.

The DeviceNet standard requires that a certain communication establishment protocol be followed each time a node enters a DeviceNet network. While this requirement enhances communication reliability, the present invention recognizes that the multi-second delay required for the DeviceNet communication establishment protocol is unacceptable, particularly in automated assembly lines or other environments in which nodes are constantly being added to and dropped from the DeviceNet network, for example, as automated tools are connected and disconnected from assembly line robots.

SUMMARY OF THE INVENTION

In view of the foregoing, the present invention provides a tool changer including a tool attachment mechanism and a changer electronics module. The changer electronics module implements a tool changer node on a device network for the tool changer and a tool plate node on the device network for a tool plate of an automated tool that may be latched to the tool changer. Because the tool plate node resides on the tool changer, no communication establishment protocol need be performed by the tool changer node when a tool is latched to the tool changer.

All objects, features, and advantages of the present invention will become apparent in the following detailed written description.

BRIEF DESCRIPTION OF THE DRAWINGS

The novel features believed characteristic of the invention are set forth in the appended claims. However, the invention, as well as a preferred mode of use, will best be understood by reference to the following detailed description of an illustrative embodiment when read in conjunction with the accompanying drawings, wherein:

FIGS. 3A-3C depict three alternative embodiments of an automated tool changer in accordance with the present invention.

DETAILED DESCRIPTION OF ILLUSTRATIVE EMBODIMENT

Figure 1:
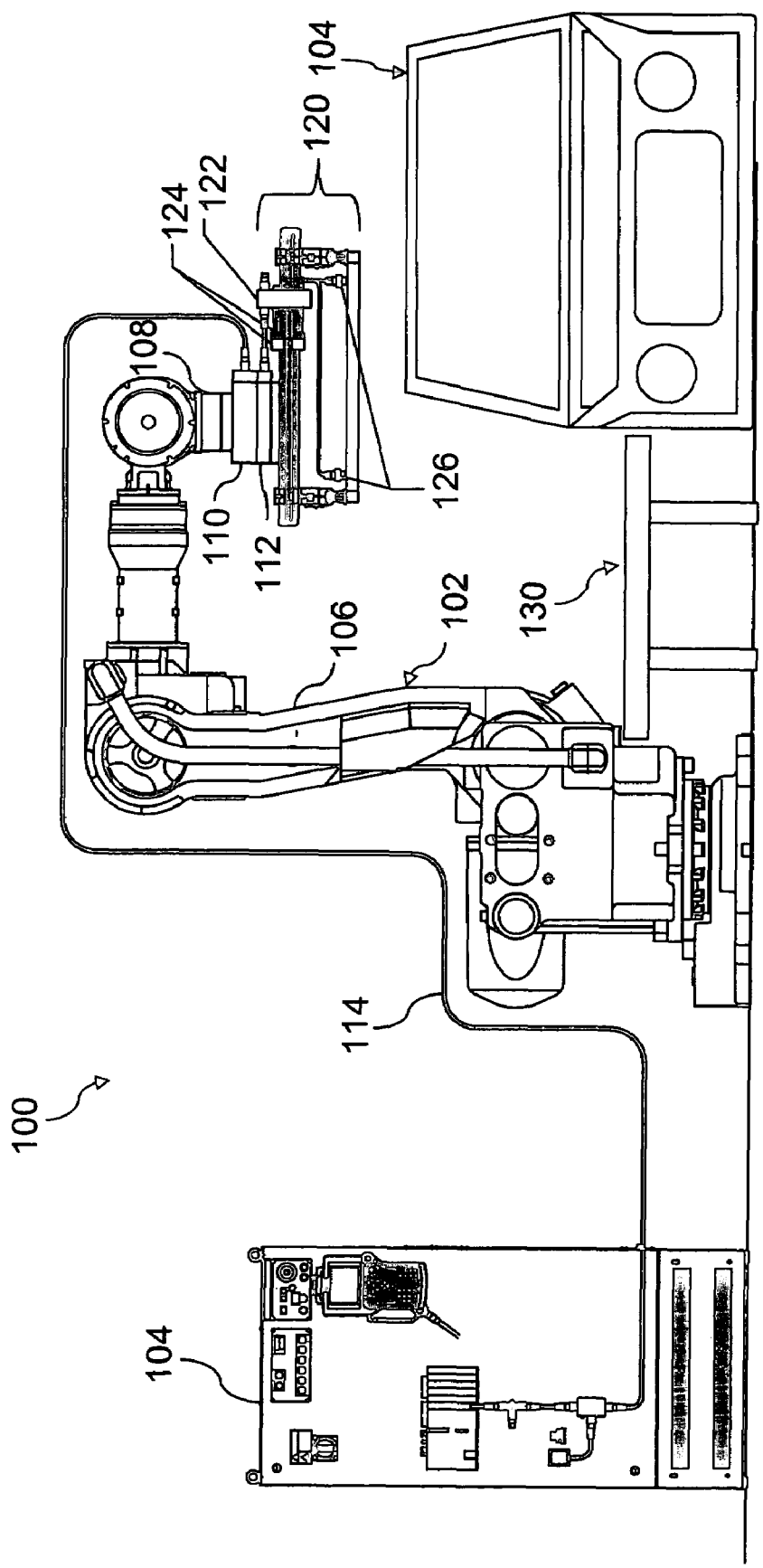
FIG. 1 is a diagram of an exemplary environment in which the present invention may advantageously be employed.

With reference to the figures and in particular with reference to FIG. 1, there is illustrated an exemplary factory environment 100 in which the present invention may advantageously be employed. The depicted factory environment 100 includes an assembly line in which automated equipment, for example, one or more robots 102 (only one of which is shown), are utilized to perform work, such as transporting, assembling and/or welding workpieces to form an auto body 104.

Robot 102 includes an articulated arm 106 terminating in a tool changer 110. Tool changer 110 may be, for example, a Quick Change 400 or Quick Change 1200 tool changer available from EOA Systems, Inc. of Carrollton, Tex. As described in greater detail below with reference to FIG. 2, tool changer 110 can be rapidly coupled and decoupled from the tool plate 112 of an automated tool 120. When not coupled to the arm 106 of robot 102 by tool changer 110, tool 120, and optionally one or more additional tools, rest upon a tool table 130. By picking up and utilizing multiple different tools in sequence, robot 102 can perform multiple diverse work steps such as lifting, transporting, and/or welding workpieces.

The movements and operations of robot 102 (and optionally one or more other unillustrated robots) are controlled by one or more controllers 104 via a device network, which may be implemented, for example, in accordance with the DeviceNet standard defined by ODVA, Inc. of Ann Arbor, Mich. or in accordance with the PROFIBUS standard promulgated by Profibus International of Karlsruhe, Germany. DeviceNet networks are specified in ODVA DeviceNet Specification 2.0 (Vols. 1 and 2), which is incorporated herein by reference as background material and is available from ODVA, Inc. PROFIBUS networks are specified in IEC 61158 Type 3 and IEC 61784, which are incorporated herein by reference as background material and which are available from the International Electrotechnical Commission (IEC). The device network includes a network backbone 114 providing physical layer connectivity for the nodes in the network. These nodes including a controller node within controller 104, a tool changer node and a tool plate node residing at tool changer 110, and one or more user nodes 122 on tool 120. The illustrated user node 122 has associated user valves 124 (outputs) and user switches 126 (inputs).

Figure 2:
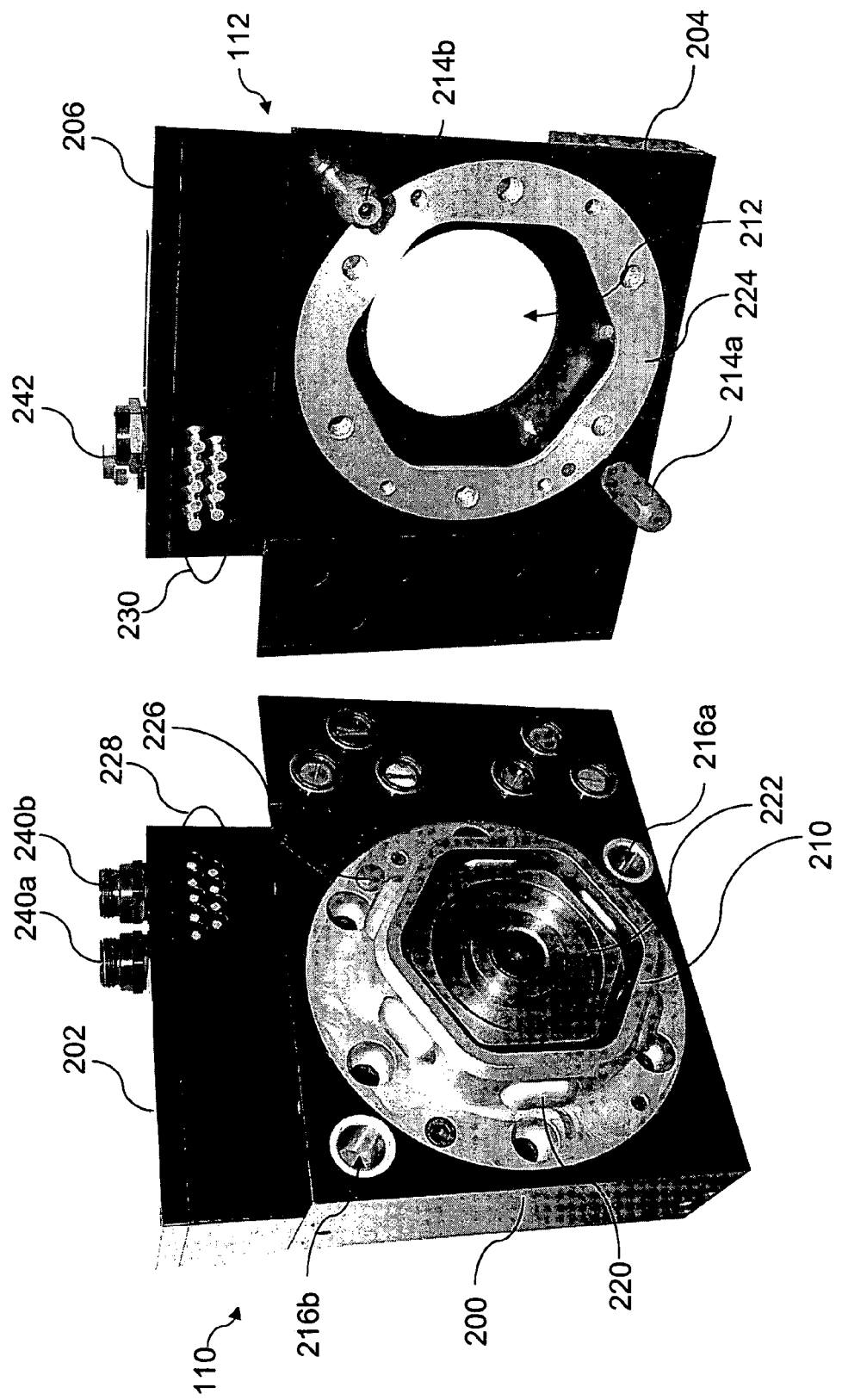
FIG. 2 is a more detailed view of a tool changer and tool plate in accordance with the present invention.

Referring now to FIG. 2, there is depicted a more detailed view of an exemplary tool changer 110 and tool plate 112 in accordance with the present invention. In the depicted embodiment, tool changer 110 is implemented as a Quick Change 1200 tool changer available from EOA Systems, Incorporated.

As shown, tool changer 110 includes a changer housing 200 and a changer electronics module 202. Likewise tool plate 112 includes a plate housing 204 and a plate electronics module 206. Each of modules 200, 206 may be integral with its respective housing 200, 204 or may be housed in a separable enclosure to facilitate repair and/or replacement of modules 200, 206.

Changer housing 200, which maybe formed, for example, of steel or other durable metal, includes a tool attachment mechanism for mechanically attaching a tool plate 112 of a tool 120 to arm 106 of robot 102. In the depicted embodiment, the tool attachment mechanism includes a projecting piston sleeve 210 sized to be received within opening 212 of plate housing 204 when index posts 214a-214b of plate housing 204 are aligned with and received in index holes 216a-216b of changer housing 200. Piston sleeve 210, which preferably has multiple facets as shown, has a plurality of elongate locking rollers 220 captured therein (e.g., one roller per facet). Locking rollers 220 may be displaced radially inwardly and radially outwardly with respect to a central axis of piston sleeve 210. To lock tool plate 112 to tool changer 110, housings 200, 204 are first mated, depressing contact button 226 of changer housing 200. The depression of contact button 226 signals that a piston 222 housed within piston sleeve 210 can then be moved from a retracted and unlatched position to an extended and latched position, for example, by the application of pneumatic or hydraulic pressure. As piston 222 is moved from the retracted and unlatched position to the extended and latched position, locking rollers 220 are engaged by piston 222 and forced radially outwardly from piston sleeve 210 and into contact with the interior sidewall of opening 212 and/or a circumferential lip of locking ring 224. In this manner, tool plate 112 and may be mechanically locked to tool changer 110, enabling precise and secure manipulation of a tool 120 connected to tool plate 112.

To disconnect tool changer 110 from tool plate 112, for example, to permit robot 102 to pick up a different tool, piston 222 is moved from the extended and latched position to the retracted and unlatched position, for example, by application of pneumatic or hydraulic pressure. As piston 222 is moved from the extended and latched position to the retracted and unlatched position, locking rollers 220 are displaceable radially inwardly toward the central axis of piston sleeve 210 by the circumferential lip of locking ring 224. In this manner, tool changer 110 may be disconnected from tool plate 112.

As described in greater detail below, changer electronics module 202 and plate electronics module 206 each house electronics that support automation of the movements of robot 102 and the operations performed by robot 102 utilizing the current tool 120. Changer electronics module 202 and plate electronics module 206 have mating bus interfaces 228 and 230, respectively, to permit signal communication therebetween. Changer electronics module 202 further includes network connectors 240a-240b for connecting changer electronics module 202 to network backbone 114, and plate electronics module 206 includes a network connector 242 to permit connection of one or more user nodes 122 to network backbone 114.

Figure 3A:
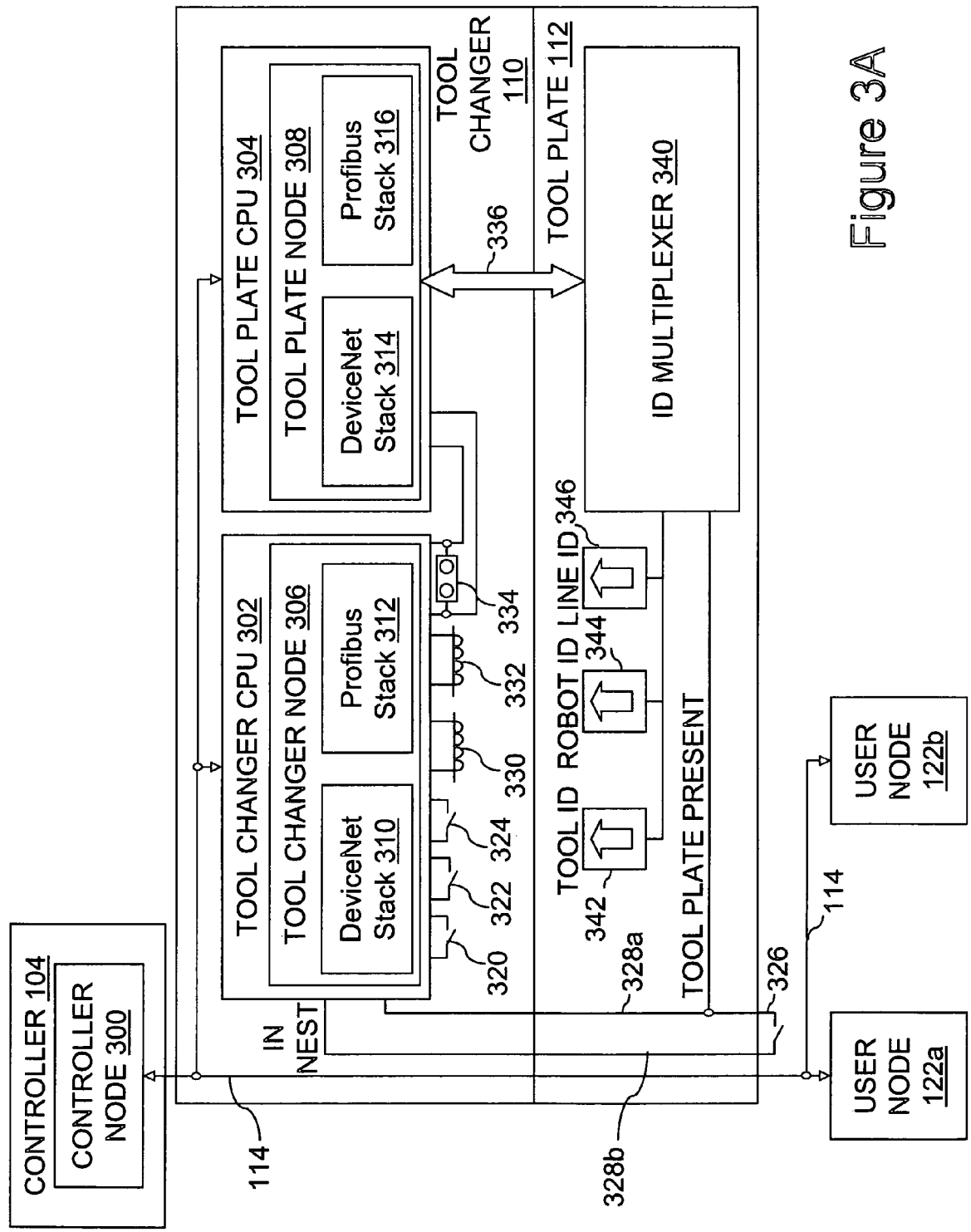
Figure 3B:
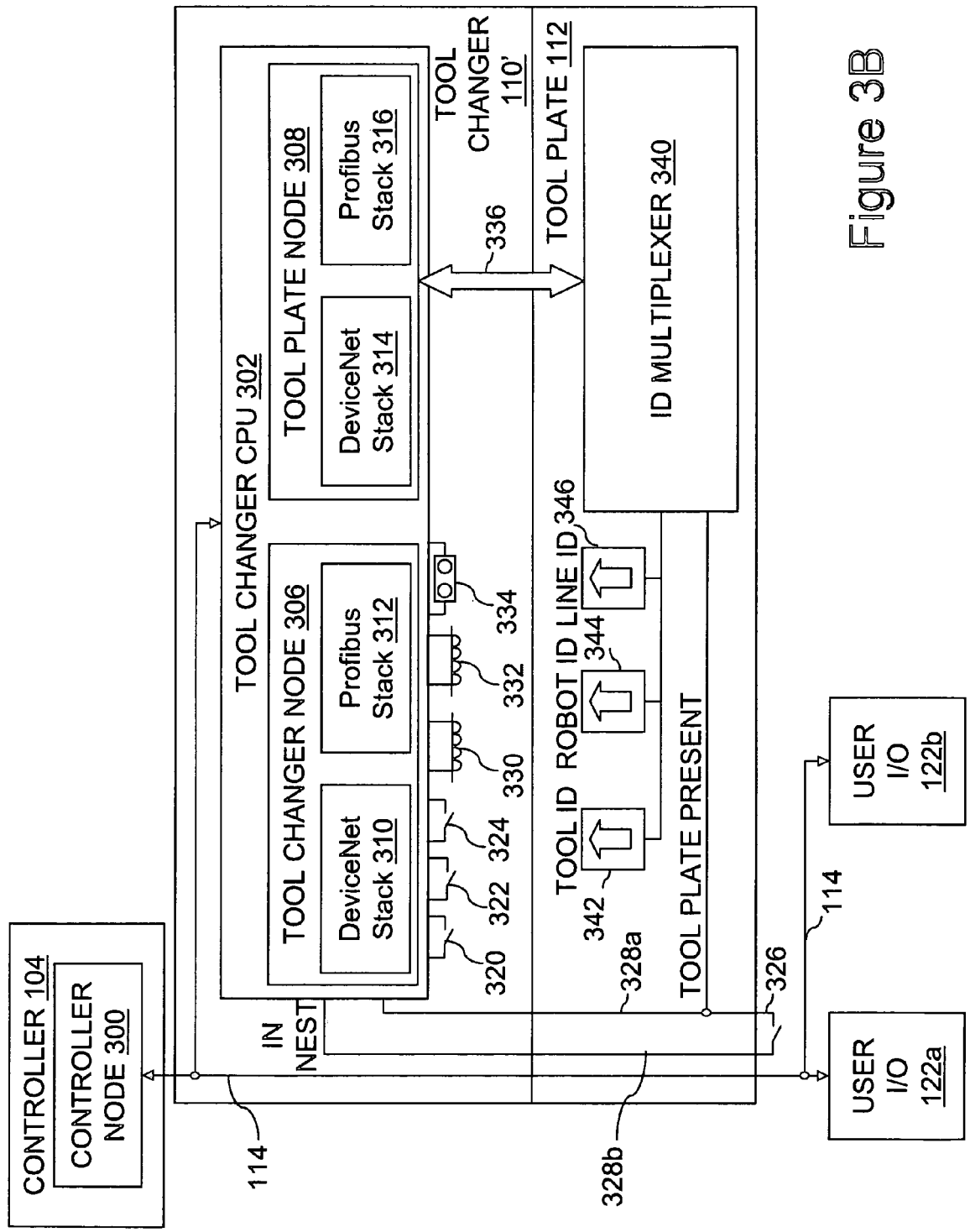

With reference now to FIGS. 3A-3C, there are depicted block diagram representations of three alternative embodiments of an exemplary automated tool changer 110 in accordance with the present invention. In all of the embodiments, tool changer 110 contains both a network node for tool changer 110 and a network node for tool plate 112, where "node" is defined in accordance with the DeviceNet standard as a collection of objects that communicate on a network with a common identifier (e.g., MAC ID). Because the node for tool plate 112 resides within tool changer 110 rather than within tool plate 112, the node for tool plate 112 remains connected to network backbone 114 and in communication with controller 104 regardless of whether tool plate 112 is physically latched to or unlatched from tool changer 110. Consequently, the communication establishment protocol conventionally performed when a tool plate 112 of a tool 120 is latched to tool changer 110 and the concomitant delay in operation are eliminated, while permitting full compliance with the device network standard employed on network backbone 114.

Referring now specifically to FIG. 3A, network backbone 114, which may be selectively implemented as a DeviceNet or PROFIBUS network, is connected to a plurality of network nodes, including a controller node 300 within controller 104, one or more user nodes 122a, 122b residing on a tool 120, and tool changer node 306 and tool plate node 308 located within tool changer 110. Because network backbone 114 is passed through tool changer 110 and tool plate 112 to user nodes 122, end-to-end communication with all nodes remains fully compliant with the selected device network communication model.

In the depicted embodiment, tool changer node 306 and tool plate node 308 are implemented utilizing respective tool changer and tool plate Central Processing Units (CPUs) 302 and 304 disposed within changer electronics module 202. Each CPU includes processing circuitry for processing instructions and data, as well as buffer storage for instructions and data.

As mentioned above and as understood by those skilled in the art, tool changer node 306 and tool page node 308 communicate with other network nodes connected to network backbone 114 utilizing a selected layered communication protocol, which is typically implemented through the execution of a software stack. In the depicted embodiment, tool changer node 306 and tool plate node 308 may selectively employ either DeviceNet stacks 310, 314 to support communication in accordance with the DeviceNet standard or PROFIBUS stacks 312, 316 to support communication in accordance with the PROFIBUS standard. Tool changer CPU 302 and tool plate CPU 304 may select one of the multiple possible layered communication protocols, for example, in response to the setting of a jumper 334 within changer electronics module 202.

In addition to participating in device network communication on network backbone 114, tool changer CPU 302 controls movement of piston 222 and thus the latching and unlatching of tool plate 112 from tool changer 110. Tool changer CPU 302 control the movement of piston 222 based upon signals received from controller 104 via network backbone 114 and its monitoring of signal inputs associated with one or more sensor switches 320, 322, 324 and 326. In the depicted embodiment, sensor switch 320 is operated by contact button 226 and generates a "Ready to couple" signal when contact button 226 is depressed by tool plate 112. In response to receipt of the "Ready to couple" signal, tool changer CPU 302 may energize latch solenoid 330 to open a pneumatic valve to cause piston 222 to be moved to its extended and latched position. Sensor switch 322 generates a "Latched" signal in response to piston 222 reaching its fully extended and latched position. While a tool plate 112 is latched to tool changer 110, signal line 328a is asserted via bus interfaces 228-230 to indicate "Tool plate present".

To prevent a tool 120 from being inadvertently dropped from tool changer 110, tool changer CPU 302 preferably energizes an unlatch solenoid 332 to open a pneumatic valve to cause piston 222 to be moved to its retracted and unlatched position when a "Tool plate present" only if the attached tool 120 is resting on tool table 130. In the depicted embodiment, contact between tool 120 and tool table 130 is indicated by the assertion of "Tool in nest" signal line 328b via bus interfaces 228-230 in response to the closure of sensor switch 326.

Still referring to FIG. 3A, tool plate CPU 304 monitors the values of Tool ID, Robot ID and Line ID rotary switches 342, 344 and 346, which uniquely identify the tool 120 by assembly line number, robot number and tool number. These values are passed by an ID multiplexer 340 within plate electronics module 206 to tool plate CPU 304 via a tool bus 336 spanning bus interfaces 228-230. Tool plate node 308 can report the switch values to controller node 300, for example, in response to a Get Attribute service code. The communication between tool changer 110 and tool plate 112 via tool bus 336 may be implemented with any of a variety of serial buses (e.g., RS-232 or RS485), discrete data and address buses, or even a private device network such as that implemented on network backbone 114.

With reference now to FIG. 3B, there is depicted an alternative embodiment of a tool changer 110' and tool plate 112 in accordance with the present invention. As can be seen by comparison of FIG. 3B with FIG. 3A and as indicated by like reference numerals with prime notation, the embodiment of FIG. 3B is identical to that of FIG. 3A except that tool changer 110' contains a tool changer CPU 302 that implements distinct tool changer and tool plate nodes 306, 308 each having its own respective stack(s).

Referring now to FIG. 3C, there is illustrated another alternative embodiment of a tool changer 110" and tool plate 112 in accordance with the present invention. As can be seen by comparison of FIG. 3C with FIGS. 3B and as indicated by like reference numerals with prime notation, the embodiment of FIG. 3C is identical to that of FIG. 3B except that a single software stack 310 or 312 is executed by tool changer CPU 302 to support communication on network backbone 114. Separate tool changer and tool plate nodes 306, 308 are maintained, however, through the mapping by the selected software tack of communication for each of tool changer node 306 and tool plate node 308 to separate storage areas within buffer storage (as shown) or an auxiliary memory device (not illustrated) coupled to tool changer CPU 302. Thus, the software stack maps service codes (e.g., Get Attribute or Set Attribute) having a first MAC ID to the storage allocated to tool changer node 306 and maps service codes having a second MAC ID to the storage allocated to tool plate 308.

As has been described, the present invention provides an improved tool changer including a device network node for the tool changer and for a tool plate.

While the invention has been particularly shown as described with reference to a preferred embodiment, it will be understood by those skilled in the art that various changes in form and detail may be made therein without departing from the spirit and scope of the invention. For example, although aspects of the present invention have been described with respect to a system executing program code that directs at least some of the functions of the present invention, it should be understood that present invention may alternatively be implemented as a program product for use with a data processing system. Program code defining functions of the present invention can be delivered to a data processing system via a variety of signal-bearing media, which include, without limitation, non-rewritable storage media (e.g., CD-ROM), rewritable storage media (e.g., a floppy diskette or hard disk drive), and communication media, such as digital and analog networks. It should be understood, therefore, that such signal-bearing media, when carrying or encoding computer readable instructions that direct the functions of the present invention, represent alternative embodiments of the present invention.

What is claimed is:

1. A tool changer, comprising:
   a tool attachment mechanism; and
   a changer electronics module that implements a tool changer node on a device network for the tool changer and a tool plate node on the device network for a tool plate of an automated tool that may be latched to the tool changer.

2. The tool changer of claim 1, wherein said changer electronics module includes a first processing unit that implements said device network node for said tool changer and a second processing unit that implements said device network node for the tool plate.

3. The tool changer of claim 1, wherein said changer electronics module implements a first stack for said tool changer node and a second stack for said tool plate node.

4. The tool changer of claim 1, wherein said changer electronics module implements a stack utilized for communication by both said tool changer node and said tool plate node.

5. The tool changer of claim 1, wherein said tool plate node and said tool changer node select one of multiple different communication protocols for use in communication on said device network in response to an input.

6. The tool changer of claim 1, wherein said tool plate node remains in communication with said device network when no tool is latched to said tool changer.

7. The tool changer of claim 1, and further comprising a first pass-through connection to the device network for a tool plate.

8. A tool assembly, comprising:
   the tool changer of claim 7;
   a tool plate electrically and mechanically coupled to said tool changer, wherein said tool plate further comprises a second pass-through connection to the device network; and
   a tool connected to said tool plate, said tool including at least one user node connection to the device network via said first and second pass-through connections.

9. A robot, comprising:

the tool assembly of claim 7; and an articulated arm mechanically coupled to said tool changer.

10. A robot, comprising:

a tool changer, including:

a tool attachment mechanism;

a changer electronics module that implements a tool changer node on a device network for the tool changer and a tool plate node on the device network for a tool plate of an automated tool that may be latched to the tool changer; and an articulated arm mechanically coupled to said tool changer.

11. The robot of claim 10, wherein said changer electronics module includes a first processing unit that implements said device network node for said tool changer and a second processing unit that implements said device network node for the tool plate.

12. The robot of claim 10, wherein said changer electronics module implements a first stack for said tool changer node and a second stack for said tool plate node.

13. The robot of claim 10, wherein said changer electronics module implements a stack utilized for communication by both said tool changer node and said tool plate node.

14. The robot of claim 10, wherein said tool plate node and said tool changer node select one of multiple different communication protocols for use in communication on said device network in response to an input.

15. The robot of claim 10, wherein said tool plate node remains in communication with said device network when no tool is latched to said tool changer.

16. The robot of claim 10, wherein said tool changer further comprises a first pass-through connection to the device network for a tool plate.

17. The robot of claim 16, and further comprising:

a tool plate electrically and mechanically coupled to said tool changer, wherein said tool plate further comprises a second pass-through connection to the device network; and a tool connected to said tool plate, said tool including at least one user node connected to the device network via said first and second pass-through connections.

18. A system, comprising:

the robot of claim 17;

a network backbone of the device network; and a robot controller, coupled to said network backbone, that controls said robot via said device network.

19. An assembly line, comprising:

a robot, including:

a tool changer, including:

a tool attachment mechanism;

a changer electronics module that implements a tool changer node on a device network for the tool changer and a tool plate node on the device network for a tool plate of an automated tool that may be latched to the tool changer; and an articulated arm mechanically coupled to said tool changer;

a network backbone of the device network; and a robot controller, coupled to said network backbone, that controls said robot via said device network.

20. The assembly line of claim 19, wherein said tool changer includes a first pass-through connection to the device network for a tool plate, and wherein said assembly line further comprises:

a tool plate electrically and mechanically coupled to said tool changer, wherein said tool plate further comprises a second pass-through connection to the device network; and a tool connected to said tool plate, said tool including at least one user node connected to the device network via said first and second pass-through connections.

* * * * *